May 21, 1968     A. P. J. DUTARET     3,383,883
HIGH SHOCK-ABSORBING FLEXIBLE COUPLING
Filed May 12, 1966     2 Sheets-Sheet 1
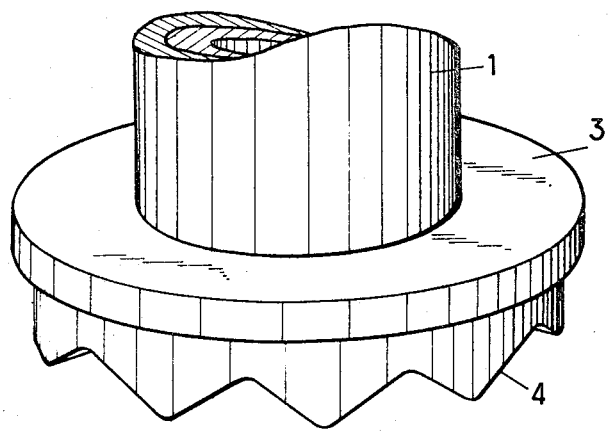
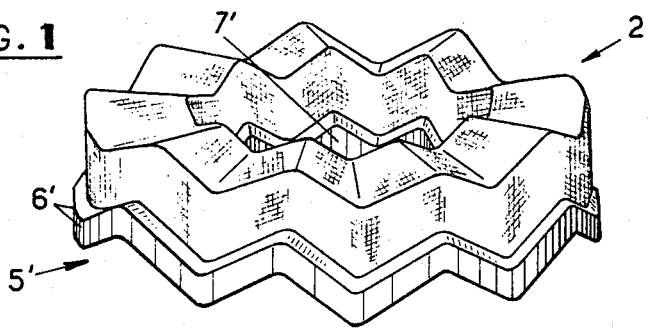
FIG. 1
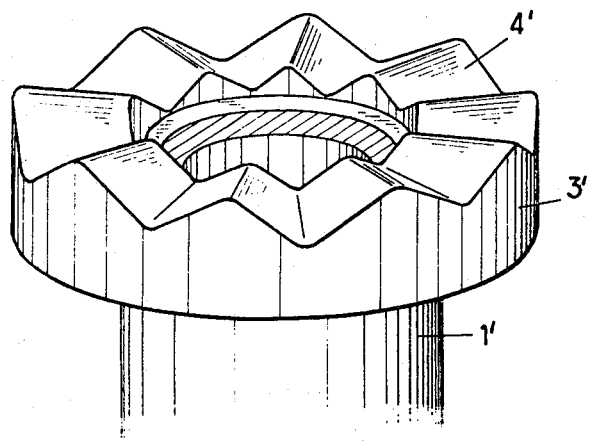
INVENTOR
ALAIN PIERRE JOSÉ DUTARET
BY J. Harold Byers May 21, 1968  A. P. J. DUTARET  3,383,883
HIGH SHOCK-ABSORBING FLEXIBLE COUPLING
Filed May 12, 1966  2 Sheets-Sheet 2
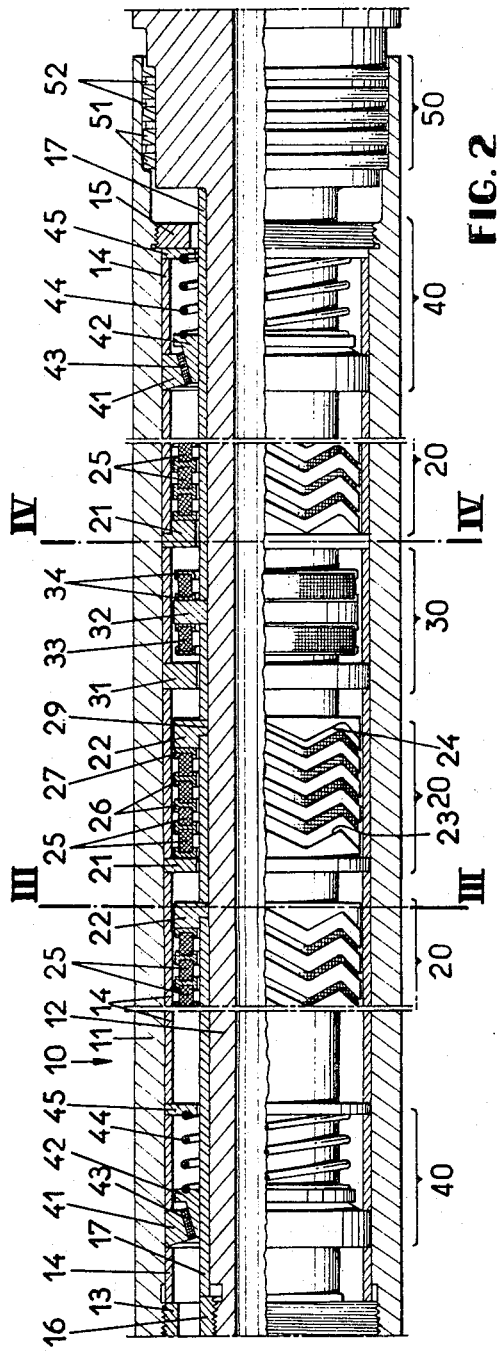
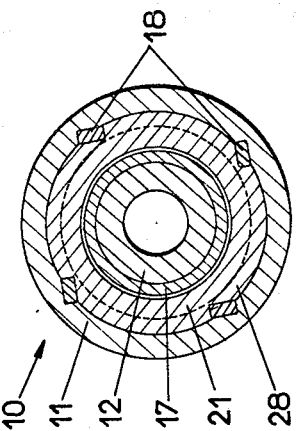
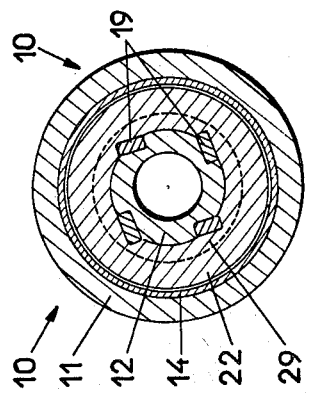
INVENTOR
ALAIN PIERRE JOSÉ DUTARET
BY United States Patent Office 3,383,883
Patented May 21, 1968

3,383,883
HIGH SHOCK-ABSORBING FLEXIBLE
COUPLING
Alain Pierre José Dutaret, 12 Rue de Tournon,
Paris, France
Filed May 12, 1966, Ser. No. 549,520
Claims priority, application France, May 14, 1965,
17,117, Patent 1,457,312
12 Claims. (Cl. 64—27)

ABSTRACT OF THE DISCLOSURE

A shock absorbing flexible coupling for shafts which comprises a flange fixed to each shaft, teeth on the facing surfaces of said flanges, an an annular pre-compressed pad of criss-crossed wires having radial faces shaped to mate with said teeth and positioned between said flanges. The pad is held in shape by a washer having a radial surface which mates with a radial surface of the pad, and a plurality of pads and washers may be inserted between two flanges. The coupling may also be associated with thrust-absorbing means comprising additional flanges and pads like those of the coupling, except for the fact that they are not provided with teeth.

---

Generally, the present invention covers flexible couplings for connecting two shafts, or the like, set end to end, which may be slightly out of alignment. These couplings normally require two flanges, or the like, fixed to the ends of the shafts and connected by one or more deformable elastic elements, such as metallic springs—plate or spiral—or parts made out of flexible material or elastomeres—either in the shape of belts, straps, rings etc., subject to tensile stresses, or of masses subject to shearing.

Although these couplings normally permit relative displacements of the coupled shafts, they can be put to even better use either for compensating for a poor transverse or angular alignment of the said shafts, or for absorbing the variations of the axial stresses or of the torque transmitted by more or less aligned shafts, allowing a certain longitudinal or angular displacement of the above mentioned shafts, respectively.

The present invention aims precisely at obtaining a flexible coupling of the latter type, capable of transmitting simultaneously an axial force and a torque while efficiently reducing shocks and vibrations.

The flexible coupling, in conformity with the invention, is notably remarkable by the fact that it is equipped with two annular flanges, each one an integral part of the shafts to be coupled together for rotation and axial translation, and whose radial faces, in front of each other, include two extra teeth between which a preformed, generally annular pad composed of criss-crossed, knitted or woven wires is set.

In conformity with the invention, the coupling, from the fact of its disposition and the nature of the elastic connecting element, presents numerous advantages over equivalent couplings known to date. As a matter of fact, the latter generally consist of separate connecting devices for torque and axial transmission respectively whereas the coupling pertaining to the invention consists of a single connecting element, of simple structure, independent of the flanges fixed on the shaft ends. The latter also being of simple and massive structure, easily manufactured for instance by molding or stamping, the coupling, constituting the object of the invention, is compact, sturdy and inexpensive. From the fact of its composition, the connecting element presents, of course, the required elastic qualities, but also absorbs important internal frictions which result in an effective reduction of shocks and vibrations; at least within a certain range of amplitude and frequency. Incidentally these elastic characteristics with an important shock absorbing capacity can naturally be adapted to any particular use by the choice of the wire and the manufacturing process, especially according to weight and the precompression of the pad.

Finally, the fact that the connecting element is entirely metallic, allows the use of the coupling pertaining to the invention under severe working conditions, particularly at high temperatures and in the presence of reactive substances, notably hydrocarbons, conditions under which, known couplings, fitted with connecting elements made of elastomeres, do not last.

Thus the invention combines the simplicity of the latter's structure and the stamina of known couplings of all-metallic construction.

According to other characteristics of the invention, the radial faces of the above-mentioned ring-shaped pad are corrugated to fit the shape of the corresponding teeth, and measures can be taken to keep the pad's outer and/or inner edges cylindrical. These can take the form of at least one washer with an annular web jammed against one of the faces of the afore-mentioned pad and equipped with a cylindrical rim on its outer and/or inner edge.

The invention also covers complex coupling devices derived from the afore-mentioned simple coupling, namely systems whose connecting element is composed of an annular stack of the above-mentioned pads, separated by stiff, corrugated, inserts whose faces made with those of the flange's teeth or waves. The system can be composed of a number of similar couplings mounted in series.

Other characteristics and advantages of the invention will appear more clearly at the reading of the following descriptions of a number of examples of applications shown on the annexed drawings. It must be quite understood that the invention is not limited to the described examples of application which are just explanatory.

On the drawings:

FIGURE 1 is an exploded perspective view of an elementary coupling in conformity with the invention.

FIGURE 2 is a view, partly in elevation, partly of the axial section of a coupling system in conformity with the invention; and FIGURES 3 and 4 are cross-sections of the system taken at points III—III and IV—IV respectively on FIGURE 2.

FIGURE 1 represents a simple coupling in conformity with the invention, designed for transmitting between two shafts 1 and 1' approximately in alignment, a torque, one way or the other, and an axial force, compressive in this particular case. As it will appear hereafter, these forces are transmitted from one shaft to the other through an element item 2, which, on the one hand can be submitted to elastic distortion, which allows limited relative displacements of shafts 1 and 1', and which, on the other hand, is the seat of sufficient internal frictions which can appreciably absorb the fluctuations of the said forces in an established range of amplitudes and frequencies.

As shown on the exploded perspective view of FIGURE 1, the shafts 1 and 1' are each equipped with an end flange of annular shape, items 3 and 3' respectively. This flange can obviously be integral with the corresponding shaft or, as shown, can be fastened to the latter. However, in this case, the flange must be part and parcel of the shaft whether in rotation or in axial translation.

On the radial facings in front of the flanges 3 and 3' there are two complementary sets of teeth, itemized 4 and 4' respectively, each of which, in the represented example, is a set of straight teeth, symmetrical, noticeably triangular and much flattened out.

It should be noted that the sets of teeth 4 and 4', for reasons which will appear as evident further on, do not have any sharp edges. Naturally, the type of teeth, their number, their location and their shape are not critical and can be modified. For instance, helicoidal or spiral teeth could be substituted for the straight teeth of the described and illustrated coupling, the section of the teeth could be differently proportioned and other than triangular, namely, appreciably sinusoidal or even notably rectangular, the pad between them being then, preferably, of a relatively small thickness.

The flexible connecting element placed between the sets of teeth 4 and 4' is generally an annular pad item 2 composed of a mass of criss-crossed wire, for instance, knitted 18/8 stainless steel wire, preformed and endowed with appropriate mechanical characteristics through precompression. The faces of the pad item 2 of the same dimensions as those of the sets of teeth, items 4 and 4', are preferably corrugated to fit with the shape of the latter. The pad can be fabricated, for instance, from a flat annular disc whose radial dimensions exceed by a predetermined amount those of pad, item 2. The outer and inner edges of the pad turn and will therefore by cylindrical by preference.

The coupling is completed to its advantage by means designed to retain the outer and/or inner edges of pad, item 2, especially to avoid the shifting of the pad and its radial extrusion under the action of the applied load. In the example of the illustrated set up, these means are constituted by a stiff washer 5' located between the set of teeth 4' of flange 3' and the corresponding facing of pad, item 2. The washer 5' made of stamped plate for instance, is constituted by an annular web, corrugated to fit with the shape of the set of teeth 4' and equipped with outer 6' and inner 7' cylindrical rims. These rims, designed to retain radially the corresponding edges of pad, item 2, only cover the latter over a fraction of their axial length, so as not to interfere with the axial and angular distortions of the pad under load. Although only one washer is shown, so that the drawing may remain quite clear, it is obvious that pad, item 2, could be held between two identical washers, whose cylindrical rims would each be of a length inferior to half the thickness of pad, item 2, under load. This device would have the consequent advantage of avoiding direct contact of the naturally abrasive pad, item 2, with each of the sets of teeth 4 and 4'.

It is quite obvious that the principle of the elementary coupling just described can be used with advantage in more complex coupling systems, such as the system illustrated by FIGURES 2, 3 and 4 and described hereunder as an example of the application of the invention. This set-up itemized by number 10 as a unit, is designed for coupling a rotary rock bit or three-cone bit—to a drilling string. In this particular application, the forces to be considered are very important, and are specially subjected to strong variations. As far as the vertical forces are concerned, the normal working load of the tool varies from 3 to 30 tons, but accidental overloads can exceed 100 tons. The normal engine torque varies from 180 to 1.800 foot-pounds, but can attain considerable values, over 7.200 foot-pounds in case the rock-bit jams and during various operations.

Also, the operation of the bit, because of unevenness of the structure or of the nature of the soil through which one is drilling, inevitably produces intense shocks and vibrations which it is important to avoid transferring to the pipes composing the drilling string which frequently work very close to their stress limit. It is therefore necessary to insert a coupling system, capable of transmitting longitudinal forces and important and variable torques while efficiently reducing shocks and vibration, between the rock bit and the drilling string.

The unit, item 10, shown on FIGURES 2 to 4 includes two co-axial sleeves, items 11 and 12, the outer sleeve, item 11, being fixed by its left hand end on the drawing, to the drilling string (not shown), while the inner sleeve, item 12, supports at its right hand end the drilling tool (not shown).

Between the sleeves, items 11 and 12, numbers of similar shock-absorbing elements are fitted one after the other, only one of which is partially shown. Each of these elements is composed of a number of high shock-absorbing capacity flexible couplings, item 20, set on each side of a central thrust collar, item 30. The unit, item 10, is completed, at both ends, by a centering device, item 40, and on the rock-bit side by a fluid-tight device, item 50, which closes the end of the outer sleeve, item 11. Each of the couplings, item 20, is composed of two rings, items 21 and 22, axially spaced, integral in rotation and axial displacement with the outer sleeve, item 11, and inner sleeve, item 12, respectively. The radial faces in front of rings, items 21 and 22, are provided with complementary sets of teeth, items 23 and 24, respectively, similar to those of the flanges, items 3 and 3', of the previously described elementary coupling. A high shock-absorbing capacity flexible coupling is placed between these sets of teeth. These high shock absorbing capacity couplings are formed by stacking numbers of annular metallic pads, item 25, all similar to the previously described pad, item 2. The pads are separated from each other by intermediate washers, item 26, and the stack is finished off by two end washers, item 27. The radial facings of the pads, item 25, and the webs of the washers, items 26 and 27, are corrugated to correspond to the shape of the sets of teeth, items 23 and 24, in the same manner as the pad, item 2, and the washer, item 5', of the previously described elementary coupling. The washers, items 26 and 27 are similar to washer, item 5', except for the fact that the inner and outer cylindrical rims of the intermediate washers, item 26, extend symmetrically on each side of the corrugated web.

The thrust collar assembly, item 30, consists of two rings, item 31, axially spaced around a central ring, item 32. The rings, items 31 and 32 are integral, at least as far as translation is concerned, with the outer, item 11, and inner sleeves, item 12, respectively and their radial faces are flat. In the example shown, to simplify matters, ring, item 31, on the right, is in fact, constituted by ring, item 21, of the adjacent flexible coupling, item 20. On each side of the central ring, item 32, are located two annular metallic flat-faced pads, item 33, each of which is held between two washers, item 34, with a flat annular web and cylindrical rims. It will be noted that the radial facings' spacing in front of rings, items 31 and 21, is much greater than the cumulated thicknesses of ring, item 22, of pads, item 33, and washers, item 34, together.

The centering devices, item 40, are each composed of an outer race, item 41, integral part of the outer sleeve item 11, at least as far as translation is concerned, and an inner race, item 42, which is free to slide along the inner sleeve, item 12. The races, items 41 and 42, have on their inner and outer faces respectively, two conical bearing surfaces at the same angle, between which an annular, slanting, rectangular section, metallic pad, item 43, is jammed by means of the axial thrust exerted on the sliding race, item 42, by a spiral spring, item 44, which bears against a race, item 45, which is an integral part of outer sleeve, item 11, at least as far as translation is concerned.

The axial retention of rings, items 21 and 31 and races, items 41 and 45, in relation, to the outer sleeve, item 11, and of rings, items 22 and 32, in relation to the inner sleeve, item 12, is simply obtained by means of tubular spacers associated with the said sleeves.

To be even more accurate, the outer sleeve, item 11, includes at the left-hand end of the unit, item 10, a threaded part into which is screwed a gland, item 13, which acts on the first of a set of tubular spacers, item 14, whose outer diameter is approximately equal to the inside diameter of the sleeve, item 11. Rings, items 31 and races, items 41 and 45, are directly held in place between two spacers, item 14, one on each side, whereas the toothed rings, item 21 are each machined with an outer flat-faced flange, item 28, which alone, is held by the adjacent spacers, item 14. The race, item 45, located at the right hand end of the unit, item 10, is held by the last spacer, item 14, against a stop screw socket, item 15, which is blocked against a shoulder machined in the inside bore of the sleeve, item 11.

In the same way, the inner sleeve, item 12, is externally threaded, at the left hand end of unit item 10, and on which is screwed a tightening socket piece, item 16, which acts on the first of a set of spacers, item 17, whose inside diameter is approximately the same as the outside diameter of sleeve item 12.

The rings, item 32, are held directly between two following spacers, item 17, while the toothed rings, item 22, are machined with an inner flat-faced flange, which alone is held between the adjacent spacers, item 17. The last spacer, item 17, bears against a shoulder at the right hand end of sleeve item 12.

The toothed rings, items 21 and 22, at least, are retained during rotation in relation to the outer and inner sleeves, items 11 and 12 respectively, by means of keys, items 18 and 19 clearly visible on FIGURES 3 and 4.

The fluid-tight device, item 50, designed to close the right hand end of outer sleeve item 11, can be of any type, as long as it allows a noticeable relative play of the two sleeves in the axial direction or in rotation. In the example shown the fluid-tight device is just composed of a series of O rings or similar, item 51, and spacers, item 52, placed in the annular stuffing box machined in sleeves, items 11 and 12.

During normal operation, that is without any accidental overloads, the unit, item 10, works approximately in the same way as the previously described elementary coupling.

However, it will be noted that if unit item 10 is equipped with N similar shock-absorbing flexible elements, item 20, and if the relative axial positioning of rings, items 21 and 22, is ensured by spacers, items 14 and 17 respectively, is the same in each of the said elements, item 20, the latter will share equally the forces to be transmitted; this means that each element, item 20, and for the same reason, each of its pads, item 25, will assume the transmission of the *n*th part of the axial load and torque. On the other hand, if each element, item 20, is fitted with P similar pads, each pad will only absorb the Pth part of the relative displacement, axial and/or angular, of sleeves items 11 and 12.

This means that, by adjusting the number N of elements, item 20, and the number P of pads, item 25, it is possible to combine, in a system of limited radial space, an axial and angular load capacity of the required amount with a working rate of, for example, approximately 570 to 1140 lbs./sq. inch, which will efficiently filter undesirable vibrations, especially those which might entail resonance phenomena.

On this subject, it will be noted that the stacking of elements, item 20, lowers to a great extent the unit's own resonance frequency and hence, the lowest frequency limit of the efficiently filtered vibrations. Another advantage of this setup is to contribute to the maintaining of the alignment of sleeves, items 11 and 12, and to avoid any "whipping" of the unit, item 10. The last mentioned functions particularly concern the centering devices, item 40, whose pads, item 43, should preferably be strongly pre-compressed, so as to ensure, with precision, the centering of the inner race, item 42. Naturally, the number of centering devices, item 40, and their setting, can vary according to the length of unit, item 10.

Accidental torque overloads are easily controlled by the connecting elements, item 20, on condition that the number P of the pads, item 25, is sufficient in each element, so that the angular deflection of each pad remains within acceptable limits, and on condition that simultaneous longitudinal forces be limited to a low enough value to leave a sufficient margin for elastic distortion of the said pads, item 25.

This last responsibility is assumed by the thrust absorbing assemblies, item 30. When the axial overload attains the afore-mentioned values, the relative displacement of sleeves, items 11 and 12, resulting from the compression of elements, item 20, brings one or the other of rings, items 21 and 31, according to the direction of the axial load, into contact with the corresponding pad, item 33. The latter, strongly pre-compressed so as to accept a normal load at least equal to 2800 lbs./sq. inch, for instance, then practically absorbs any overloading for a relatively small displacement of sleeves, items 11 and 12, which only results in a small increase of the compression of pads, item 25.

Of course, the invention is in no way limited to the described examples, which have just been given by way of illustration.

What is claimed is:

1. A shock absorbing flexible coupling for the simultaneous transmission of an axial force and a torque between two shafts in at least approximate axial alignment, said coupling comprising two flanges, one fixed to each shaft for movement therewith, said flanges having opposed faces provided with sets of teeth, a pad of generally annular shape positioned between said teeth, said pad being made of a pre-compressed mass of criss-crossed wires having radial faces formed to mate with said teeth, and a washer provided with a radial web portion shaped to fit one of the radial faces of said pad and at least one rim which retains an edge of said pad against radial movement.

2. Flexible coupling according to claim 1, characterized by the fact that the teeth machined in the radial faces of the flanges have a flattened profile.

3. Flexible coupling according to claim 1, characterized by the fact that the profile of the teeth machined on the radial faces of the flanges is substantially symmetrical.

4. Flexible coupling according to claim 1, characterized by the fact that the cross-section of the teeth machined on the radial faces of the flanges is approximately triangular.

5. Flexible coupling according to claim 1, characterized by the fact that a radial section of the annular pad has a rectangular shape.

6. A shock absorbing coupling as claimed in claim 1 in which at least one of said shafts is hollow and they are at least partially concentric, with one of said flanges projecting radially inwardly from the outer shaft and the other flange projecting radially outward from the inner shaft.

7. A shock absorbing coupling as claimed in claim 6 comprising a plurality of said pads positioned between said flanges, and intermediate washers separating said pads from each other, said washers being shaped to mate with the radial faces of said pads.

8. A shock absorbing coupling system comprising a shock absorbing coupling as claimed in claim 6 and at least one thrust-resisting assembly, said assembly comprising two axially spaced rings, one mounted to move axially with each of said shafts, and at least one additional pad of criss-crossed wires positioned between, but axially spaced from, said rings.

9. The system claimed in claim 8 in which the radial faces of said last mentioned pads are flat.

10. The system claimed in claim 9 comprising at least two of said couplings positioned on opposite sides of said thrust-resisting assembly.

11. The combination claimed in claim 10 comprising also at least one centering device comprising two races, one of which is mounted to move axially with one of said shafts and the other of which is mounted to slide along the other of said shafts, said races being formed with mating conical bearing faces which are spaced from each other by a pad of criss-crossed wires shaped to mate with the bearing surfaces of said races.

12. The combination claimed in claim 11 which comprises a spring biasing said one of said races toward the other.

References Cited

UNITED STATES PATENTS

| | | | |
|---|---|---|---|
| 2,084,080 | 6/1937 | D'Aubarede. | |
| 2,462,316 | 2/1949 | Goodloe | 267—1 |
| 2,755,079 | 7/1956 | York et al. | 267—1 |
| 2,910,843 | 11/1959 | Happ et al. | 64—27 |
| 3,306,078 | 2/1967 | Hughes | 64—27 |

HALL C. COE, *Primary Examiner.*